May 4, 1948. L. L. LIGGIO 2,440,863
TIRE ANTISKID DEVICE
Filed April 26, 1947 2 Sheets-Sheet 1
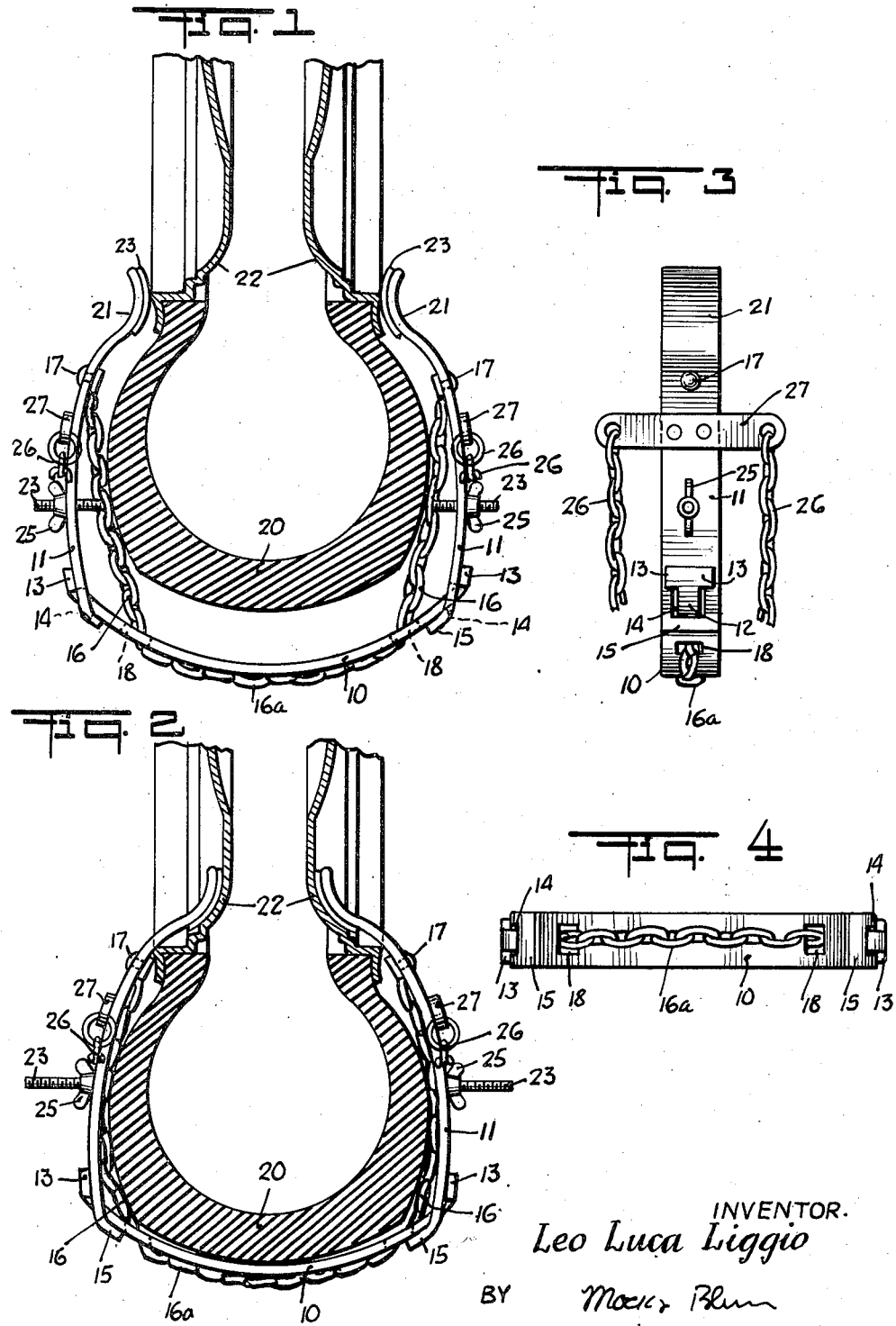
INVENTOR.
Leo Luca Liggio
BY Mock & Blum
ATTORNEYS May 4, 1948. L. L. LIGGIO 2,440,863
TIRE ANTISKID DEVICE
Filed April 26, 1947 2 Sheets-Sheet 2
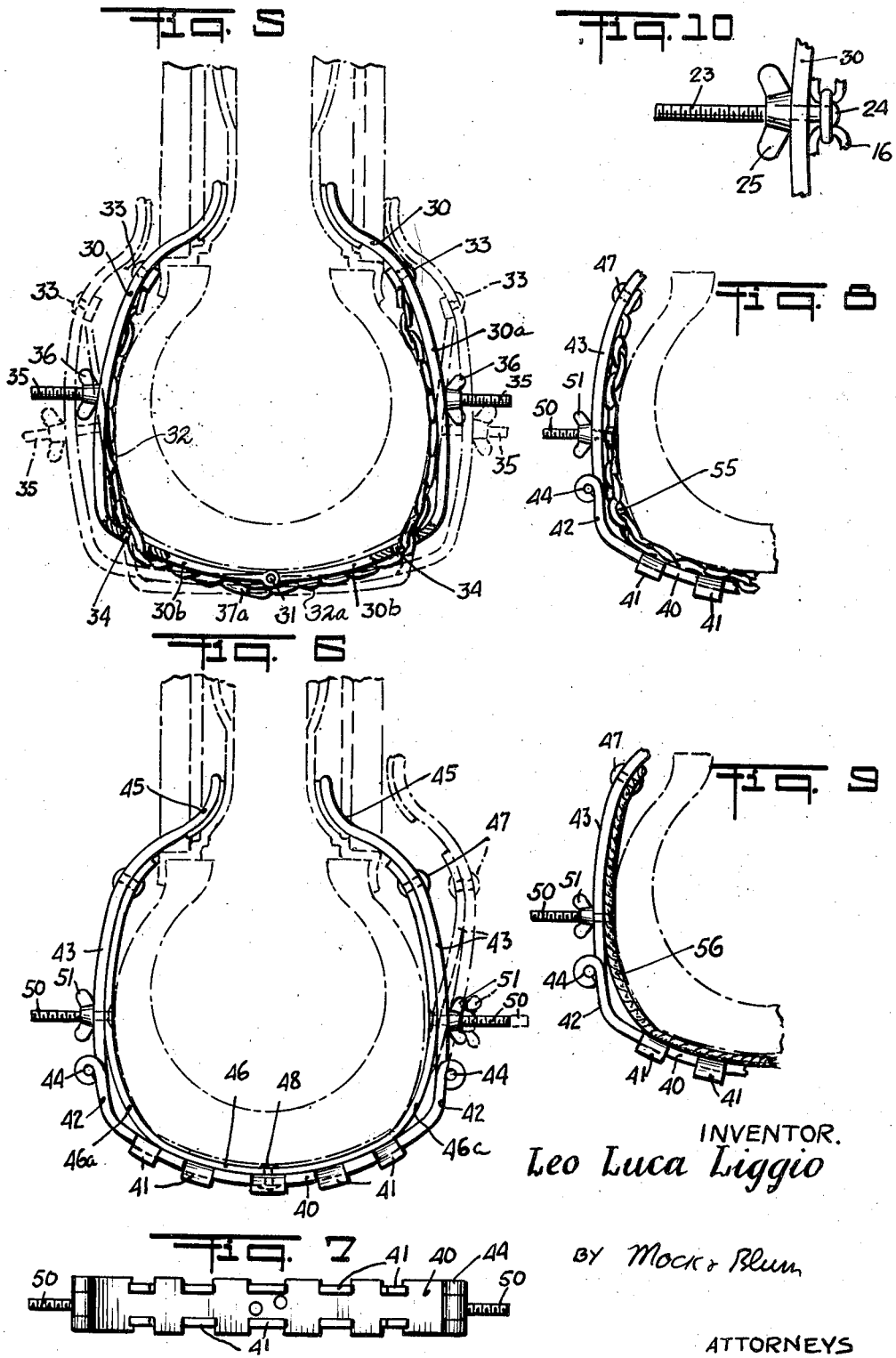
INVENTOR.
Leo Luca Liggio
BY Mock & Blum
ATTORNEYS Patented May 4, 1948

2,440,863

UNITED STATES PATENT OFFICE 2,440,863

TIRE ANTISKID DEVICE

Leo Luca Liggio, Yonkers, N. Y.

Application April 26, 1947, Serial No. 744,089

5 Claims. (Cl. 152—223)

This invention relates to new and improved anti-skid devices for motor vehicle wheels, and particularly to such devices which may be readily and expeditiously applied in and removed from operating position as required by road conditions.

Anti-skid devices presently available are generally either of the overall chain type to be mounted completely around the circumference of the tire and usually requiring that the wheels of the vehicle be completely jacked up above the ground for the application of the device thereto or are alternatively of the individual link type having flexible straps which must be passed around the rim of the wheel and tensioned by hand to secure the device in operating position. The overall chain type device is cumbersome and difficult to apply in an emergency while the latter, individual, flexible strap devices are not alone limited in their use since most modern cars are equipped with solid disc-type wheels having no apertures through which the straps may be passed but are additionally ineffective in use where they can be applied, since the straps cannot easily be positioned around the wheel rim and adequately tensioned by hand to properly secure the individual devices in operating position. Further, anti-skid devices have been proposed having various types of clamping arrangements for securing the devices around the tire and against the side walls thereof, which arrangements, to the best knowledge of the present inventor, have either proven ineffective in use or injurious to the tire with extended use or both.

Accordingly, it is among the objects of the present invention to provide an anti-skid device which is adaptable to any type of wheel construction and easily, rapidly and effectively securable in and dismountable from operating position; which eliminates the use of straps passing around the rim of the wheel; which may be effectively and positively secured in operating position against the rim of the wheel as well as against the side walls of the tire so as to minimize the stress exerted against the side walls of the tire and prevent injury thereto; and which further is so designed and constructed as to effectively utilize the downward component of the weight of the vehicle in keeping the device secured in the adjusted operating position when the device makes contact with the pavement, which is the time of greatest stress upon the device.

My improved anti-skid device may be considered in general terms as comprising a frame member having a base portion and a pair of side arms pivotally secured at each end of the base portion. A flexible tensioning element is provided for the frame member, a portion of which element may preferably serve as an anti-skid element or, alternatively the base portion may be provided on its outer surface with anti-skid projections of any suitable character. In either case, each end of the tensioning element is secured fixedly, as by riveting or welding, adjacent the upper free end of each of the pivoted side arms of the frame member, the side arms being of sufficient length and proper conformation to contact the rim of the wheel adjacent the bead of the tire when the device is adjusted in proper position with the tread of the tire contacting the inner surface of the base portion of the frame member. The tensioning element may take the form of a chain, metal band, metal cord or other suitable strong, flexible material. Where, as in the preferred embodiment of the invention, a portion of the tensioning element serves as an antiskid element, the tensioning element is passed through apertures disposed in the base portion of the frame member adjacent each of the pivoted side arms so as to be externally of said base portion and contact the pavement.

Adjustable means are provided for moving each of the side arms inwardly against the side walls of the tire and the rim of the wheel. This means may take the form of a bolt fixedly attached to the tensioning element, as by welding, and passing through an aperture in the side arm of the frame, preferably at approximately the level of the midpoint of the side wall of the tire, to receive an adjustable wing-nut or the like. In securing the device to the tire and rim of the wheel, the frame of the device is inserted fully over the tire with the tread portion of the tire contacting the inside of the base portion. Each of the wing-nuts is then tightened to draw each of the side arms against the side wall of the tire and the rim of the wheel. An extremely important feature of the invention resides in the fact that the overall length of the tensioning element is slightly less than the perimeter of the tire contained within the tensioning element. Thus, when the device has been secured to the tire and rim in the above described manner and the device comes into contact with the pavement, the downward component of the weight of the motor vehicle exerts a pull on each end of the tensioning element which is rigidly secured to the upper end of a corresponding pivoted side arm and has the novel and favorable action of tightly tensioning the side arms of the device against the side walls and wheel rim at the time of greatest stress upon the device. In this connection, it is important to note that the ends of the side arms contact the wheel rim above the tire to prevent any harmful effect on the side walls and inner fabric of the tire as might result from continued and excessive pressure in the absence of this feature of the invention.

The foregoing objects as well as additional objects and advantages of the device will readily appear in the course of the following detailed description taken in connection with the accompanying drawings, which illustrate preferred embodiments of the invention, and wherein:

Fig. 1 is a cross-sectional view of a tire and wheel rim about to be engaged by an anti-skid device embodying the features of the invention;

Fig. 2 is a view similar to Fig. 1 showing the device in completely engaged and locked position about the tire and wheel rim;

Fig. 3 is a side elevation of the device partially illustrating an auxiliary pair of anti-skid elements in the form of chains and spaced from the frame of the device by means of a cross-member;

Fig. 4 is a bottom plan view of the device with the auxiliary anti-skid elements omitted for simplicity;

Fig. 5 is a front elevational view of a slightly modified device;

Fig. 6 is a front elevational view of another modification of the invention utilizing a flexible metal band solely as a tensioning element, the base portion of the frame being provided with anti-skid protuberances;

Fig. 7 is a bottom plan view of the device of Fig. 6;

Fig. 8 is a fragmentary elevation of another modified form of the device employing the anti-skid protuberances of the previous modification and utilizing a chain as the tensioning element;

Fig. 9 is a fragmentary elevation of an additional modification employing a flexible metal cord as the tensioning element;

Fig. 10 is a fragmentary detail view illustrating the adjustable means fixed to the tensioning element for moving the side arms inwardly into locked position against the side walls of the tire and the wheel rim.

The device comprises a frame adapted for engagement about the tread and side walls of the tire and also having an upper portion adapted for engagement against the wheel rim supporting the tire.

Referring initially to the modification of the device illustrated in Figs. 1-4, the frame of the device comprises a tread or base member 10 and a pair of side members 11 pivotally attached to said base member at the extremities thereof. The pivotal connection between the members may be effected in any desired manner. By way of example, base member 10 may have at each end integral tongues 12 and a pair of detent lugs 13 insertable within slots 14 adjacent the bottom end of each of the side members 11. The bottom end of each of said side members 11 may be turned inwardly as at 15 for cooperation with detent lugs 13 to limit the outward motion of said side members with respect to base member 10 and to aid in mounting the device in operating position.

A flexible tensioning element 16 is provided for the frame of the device and is rigidly secured at its extremities to the inside of the upper portion of each of the side members 11 as by rivets 17, welding or in any other suitable manner. Tensioning element 16 may take the form of chain, as illustrated in Figs. 1-4, metal band, or metal cord or any other strong, flexible material and extends freely downwardly from its point of connection with side members 11 and through apertures 18 in base member 10 to be disposed externally of said base member as indicated at 16a in order to contact the pavement and serve as an anti-skid element of the device. In this embodiment where a portion 16a of tensioning element 16 serves also as an anti-skid element of the device, a chain structure is to be preferred. The distance between the apertures 18 in base member 10 is preferably not greater than the width of the tread portion of tire 20 so that the side walls of the tire may press downwardly on the portion of the tensioning element 16 intervening between each aperture 18 and rivet 17 for a purpose to be fully described hereinafter.

The free end of each of the side members 11 is inwardly curved as indicated at 21 for engagement against the wheel rim 22 and is preferably provided with inner facings 23 of rubber or the like.

Suitable adjustable means is provided for moving each of the pivoted side members 11 inwardly against the side walls of tire 20 and against wheel rim 22 in the locked position of the device illustrated in Fig. 2. This means may conveniently take the form of a bolt 23 secured fixedly to the tensioning element at 24 (see Fig. 10) preferably at a level of approximately the midpoint of the side wall of the tire and passing through a hole or slot in each of the side members 11 to receive a wing-nut 25.

In order to secure the device in operating position, wing-nuts 25 are turned outwardly or loosened sufficiently to allow the device to be passed over the side walls of the tire until the tread of the tire contacts the inner surface of base member 10, as shown in Fig. 2. Wing-nuts 25 are then turned inwardly or tightened in order to move each of the side members 11 inwardly against the side walls of the tire, the terminal portions 21 of said side members being simultaneously secured against the wheel rim in locked position. As has been previously mentioned, the distance between apertures 18 in base member 10 is preferably not greater than the width of the tire in order to effectively utilize the downward component of the weight of the motor vehicle on the portions of the tensioning element 16 adjacent each side member 11, i. e. the portions of said element extending from each aperture 18 to a respective point of connection 17 on the upper portion of each of said side members. Thus, at the time that the device contacts the pavement during the rotation of the wheel, which is the time of greatest stress upon the device, the downward component of the weight of the vehicle will cause the side walls of the tire to exert a pull upon the portions of tensioning element 16 adjacent each side member 11 tending to press said side members even more firmly inwardly in the adjusted operating position of Fig. 2.

As clearly illustrated in Fig. 3, an auxiliary pair of anti-skid elements 26 is provided, each of which elements is preferably spaced from the frame of the device and is adapted to extend transversely around the tire 20 to augment the traction of the device. This arrangement may be conveniently achieved through the use of cross-members 27 rigidly secured to each of the side members 11, the extremities of each of the anti-skid elements 26 being secured in apertures adjacent each end of each of said cross members.

Referring now to Fig. 5, the modification of the device there illustrated comprises a pair of frame members 30, each of which has an upright side portion 30a and an integral base portion 30b, the members being pivotally connected at the extremities of said base portions, as at 31. A tensioning element 32 is rigidly secured at each of its extremities to the upper portion of each of the side portions 30a, as by means of rivets 33 and said tensioning element passes through apertures 34 in each of the base portions 30b adjacent the upright portion 30a to present a portion 32a disposed externally of the frame member 30 and serving as an anti-skid element. Suitable adjusting means are provided as in the previous embodiment for moving the frame members toward each other into locked position about the tire and the wheel rim. This adjusting means may take the form of bolts 35 rigidly secured, as by welding to tensioning element 32 and passing through holes or slots in each of the side portions 30a of the frame members 30 to receive wing-nuts 36. The manner of securing the device in operating position and the action of the device is similar to that described for the initial embodiment of the invention. The essential difference of the modification of Fig. 5 resides in the elimination of a separate base member for the frame of the device. The broken outlines of the figure indicate the initial position of the frame members 30 before said members are moved to locking position by means of the wing-nuts 36.

Instead of employing a tensioning element having a portion extending through apertures in the base member of the frame to be disposed externally thereof and serving as an anti-skid element as embodied in the modification of Figs. 1–4, the device may be constructed with a base member 40 presenting anti-skid protuberances 41 on its lower surface, as shown in Figs. 6 and 7. Base member 40 is substantially U-shaped having side extensions 42, to each of which extensions a side member 43 is pivotally attached as at 44. Each of the side members 43 has an inwardly turned terminal portion 45 adapted to engage the wheel rim in the locked position of the device, as illustrated in Fig. 6. A flexible tensioning element 46 is disposed entirely inside the frame of the device, said frame comprising the side members 43 and base member 40, the extremities of said tensioning element being rigidly secured to the upper portion of each of the side members 43 as by rivets 47 or in any other desired manner. Said tensioning element is preferably secured to the base member 40 centrally thereof, as by means of a rivet or rivets 48 and may be formed of metal strap or band, metal cord, metal chain or any other strong, flexible material. Suitable adjusting means is provided for moving each of the side members 43 inwardly into the locked position of the device indicated in full lines in Fig. 6. Here again said means may comprise bolts 50 rigidly secured at one end to tensioning element 46 and passing through holes or slots in each of the side members 43 to receive a wing-nut 51. Tensioning element 46 is of such length that a portion thereof, designated 46a, will be spaced from the side extensions 42 of base member 40 when the frame of the device has been secured in locked position against the side walls of the tire and the wheel rim by tightening wing-nuts 51, as illustrated in Fig. 6. As in the case of the previously described modifications of the device, the downward component of the weight of the vehicle causes the side walls of the tire to exert a pull on the rigidly secured ends of the tensioning element 46 by passing against portions 46a thereof, as the device makes contact with the pavement. Thus, at the time of greatest stress upon the device, there is a pronounced and favorable tendency urging the side members 43 firmly inwardly against the side walls of the tire and the wheel rim in the adjusted operating position of the device.

The device of Fig. 8 is similar in all respects to that of Figs. 6 and 7 and the component parts thereof are correspondingly numbered with the exception of the tensioning element 55 which is illustrated as taking the form of a chain.

In the device of Fig. 9, the tensioning element 56 is illustrated as taking the form of a metal cord.

Of course, all of the modifications of the device may be provided, if desired, with auxiliary anti-skid elements in the form of chain or the like spaced from the frame of the device and adapted to extend transversely across the tire substantially parallel to said frame, thereby increasing the traction of the device.

The anti-skid protuberances 41 of the base member 40 in the modifications illustrated in Figs. 6–9 may take any configuration which may be conveniently stamped or pressed from the material of said base member.

Since certain additional modifications may be made in the anti-skid device of the present invention without departing from the scope thereof, it is intended that all matter contained in the foregoing description and shown in the accompanying drawings be interpreted merely as illustrative and not in a limiting sense.

I claim:

1. An anti-skid device for motor vehicle wheels having tires, comprising a frame having a base member and side members pivotally attached thereto, the upper ends of said side members being inwardly turned to engage a portion of the wheel rim, a flexible tensioning element rigidly secured at each extremity to the upper portion of each of said side members and in contact with a portion of said base member, and adapted to encompass the tread and side walls of the tire, adjustable locking means fixed to said tensioning element and cooperating with each of said side members for urging said side members inwardly against the side walls of the tire and the wheel rim, and a pair of anti-skid members spaced from said frame and adapted to extend transversely across the tread of the tire.

2. An anti-skid device for motor vehicles having tires in accordance with claim 1 in which said base member presents a plurality of anti-skid protuberances on the bottom surface thereof.

3. An anti-skid device for motor vehicle wheels having tires, comprising a frame having a base member and side members pivotally attached thereto, the upper ends of said side members being inwardly turned to engage a portion of the wheel rim, said base member having an aperture adjacent each of said side members, a flexible tensioning element rigidly secured at each extremity to the upper portion of each of said side members and having a portion extending through said apertures to be disposed externally of said base member as an anti-skid element, adjustable locking means fixed to said tensioning element and cooperating with each of said side members for urging said side members inwardly against the side walls of the tire and the wheel rim, and auxiliary anti-skid elements spaced from said frame and adapted to extend transversely across the tread of the tire.

4. An anti-skid device for motor vehicles having tires in accordance with claim 3 in which the distance between said apertures in the base member does not exceed the width of the tread of the tire, whereby the downward component of the weight of the motor vehicle causes the side walls of the tire to exert a pull on the extremities of said tensioning element to urge said side members inwardly against the side walls of the tire and the wheel rim.

5. An anti-skid device for motor vehicles having tires in accordance with claim 3 in which the overall length of said tensioning element is slightly less than the enclosed perimeter of the tire, whereby the downward component of the weight of the motor vehicle causes the side walls of the tire to exert a pull on the extremities of said tensioning element to urge said side members inwardly against the side walls of the tire and the wheel rim.

LEO LUCA LIGGIO.